US012416238B2

(12) United States Patent
Jalan et al.

(10) Patent No.: US 12,416,238 B2
(45) Date of Patent: Sep. 16, 2025

(54) SHAFT FOR A TURBOMACHINE

(71) Applicant: General Electric Company, Schenectady, NY (US)

(72) Inventors: Prateek Jalan, Bengaluru (IN); Kudum Shinde, Bengaluru (IN); Milind Dhabade, Bengaluru (IN); Ravindra Shankar Ganiger, Bengaluru (IN); Tyler F. Hooper, Lynn, MA (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/734,374

(22) Filed: Jun. 5, 2024

(65) Prior Publication Data

US 2024/0318556 A1 Sep. 26, 2024

Related U.S. Application Data

(63) Continuation of application No. 17/929,554, filed on Sep. 2, 2022, now Pat. No. 12,006,833.

(51) Int. Cl.
*F01D 5/02* (2006.01)

(52) U.S. Cl.
CPC ........ *F01D 5/027* (2013.01); *F05D 2220/323* (2013.01); *F05D 2240/60* (2013.01); *F05D 2260/96* (2013.01)

(58) Field of Classification Search
CPC ............... F01D 5/027; F05D 2220/323; F05D 2240/60; F05D 2260/96; F02K 3/06
See application file for complete search history.

(56) References Cited

U.S. PATENT DOCUMENTS

| | | | | |
|---|---|---|---|---|
| 5,099,430 | A | 3/1992 | Hirsch | |
| 7,717,013 | B2 | 5/2010 | Hildebrand et al. | |
| 10,731,466 | B2 | 8/2020 | Mochi et al. | |
| 2005/0265846 | A1 | 12/2005 | Przytulski et al. | |
| 2007/0108834 | A1 * | 5/2007 | Fogal | F16F 15/324 301/5.22 |
| 2018/0128347 | A1 | 5/2018 | Chuptys | |
| 2022/0235662 | A1 * | 7/2022 | Hagan | F01D 5/027 |

FOREIGN PATENT DOCUMENTS

| | | | |
|---|---|---|---|
| CN | 109580096 | A | 4/2019 |
| CN | 110439621 | A | 11/2019 |
| CN | 111396504 | A | 7/2020 |
| EP | 1602855 | A2 | 12/2005 |
| FR | 3005095 | A1 | 10/2014 |
| FR | 3127024 | A1 | 3/2023 |
| FR | 3127025 | A1 | 3/2023 |
| JP | S6483945 | A | 3/1989 |

* cited by examiner

*Primary Examiner* — Lindsay M Low
*Assistant Examiner* — Charles J Brauch
(74) *Attorney, Agent, or Firm* — Venable LLP; David D. Leege; Michele V. Frank

(57) ABSTRACT

A turbomachine including a turbine rotor, a compressor rotor, and a shaft, and at least one balance weight assembly connected to the shaft. The shaft drivingly connects the turbine rotor with the compressor rotor to rotate the compressor rotor about a rotational axis when the turbine rotor rotates about the rotational axis. The at least one balance weight assembly including a first chamber, at least one additional chamber, and a balance weight movable between the first chamber and the at least one additional chamber.

20 Claims, 11 Drawing Sheets

SHAFT FOR A TURBOMACHINE

CROSS-REFERENCE TO RELATED APPLICATIONS

This application is a continuation of U.S. patent application Ser. No. 17/929,554 filed on Sep. 2, 2022, the contents of which are hereby incorporated by reference in their entirety.

TECHNICAL FIELD

The present disclosure relates to shafts used for turbomachines, particularly, those used in gas turbine engines for aircraft.

BACKGROUND

Turbomachines, particularly, gas turbine engines used in aircraft include at least one shaft connecting, for example, turbine rotors with compressor rotors. During operation, these shafts heat up, and upon shutdown the shafts begin to cool. The cooling of the shaft may be uneven. Uneven cooling of the rotor results in a top portion of the shaft being longer than a bottom portion of the shaft, and with the shaft being supported by bearings, this length difference creates a bow in the shaft. Depending upon the magnitude of the bow in the shaft, the bow may limit the ability to restart the engine.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Figure 1:
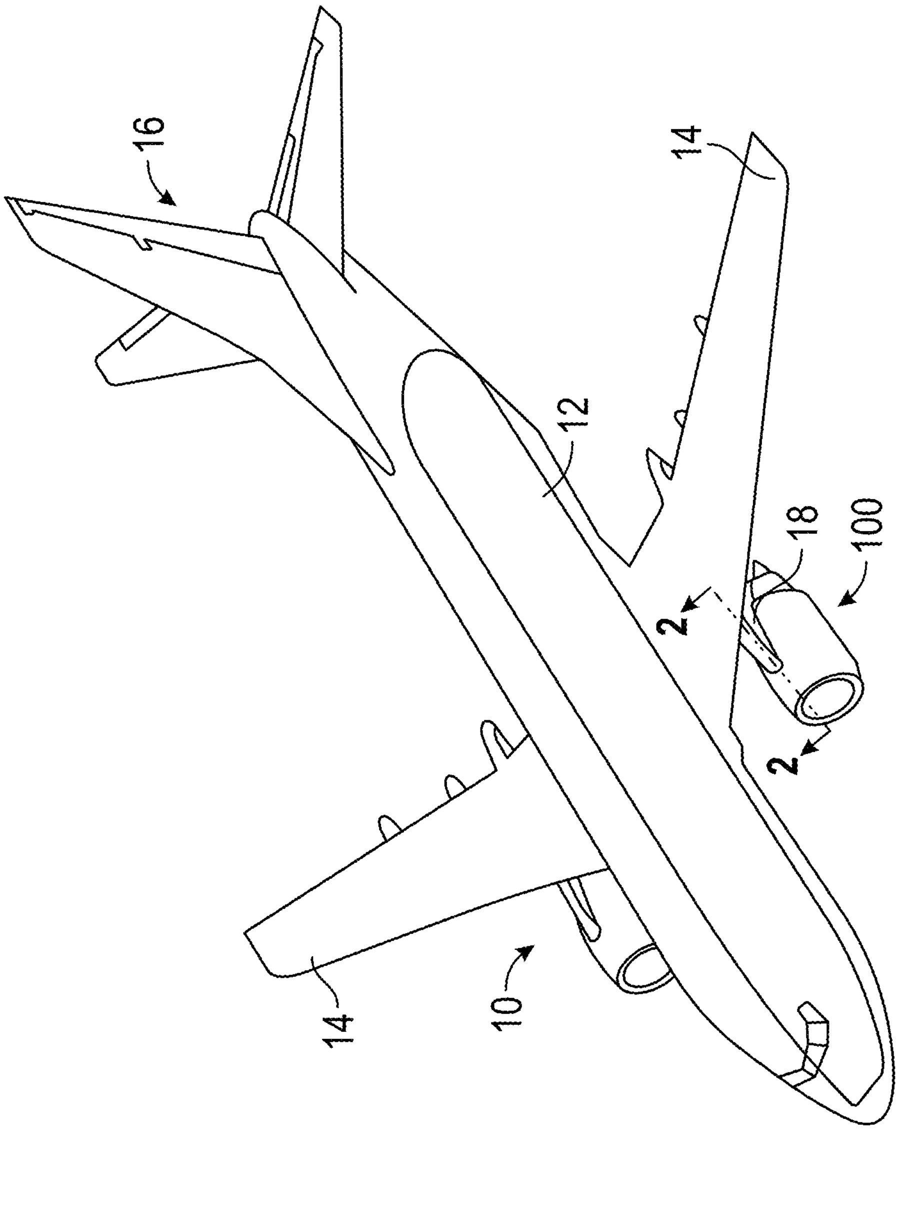
FIG. 1 is a schematic perspective view of an aircraft having gas turbine engines that may implement various embodiments of the present disclosure.

Features, advantages, and embodiments of the present disclosure are set forth or apparent from a consideration of the following detailed description, drawings, and claims. Moreover, the following detailed descriptions are exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As may be used herein, the terms “first,” “second,” and “third” may be used interchangeably to distinguish one component from another and are not intended to signify location or importance of the individual components.

The terms “forward” and “aft” refer to relative positions within a gas turbine engine or vehicle, and refer to the normal operational attitude of the gas turbine engine or vehicle. For example, with regard to a gas turbine engine, forward refers to a position closer to an engine inlet, and aft refers to a position closer to an engine nozzle or an exhaust.

The terms “upstream” and “downstream” refer to the relative direction with respect to fluid flow in a fluid pathway. For example, “upstream” refers to the direction from which the fluid flows, and “downstream” refers to the direction to which the fluid flows.

The terms “directly upstream” or “directly downstream,” as may be used herein, describe the relative placement of components in a fluid pathway, refer to components that are placed next to each other in the fluid pathway without any intervening components between them other than an appropriate fluid coupling, such as a pipe, a tube, a valve, or the like, to fluidly couple the components. Such components may be spaced apart from each other with intervening components that are not in the fluid pathway.

The terms “coupled,” “fixed,” “attached,” “connected,” and the like, refer to both direct coupling, fixing, attaching, or connecting, as well as indirect coupling, fixing, attaching, or connecting through one or more intermediate components or features, unless otherwise specified herein.

The singular forms “a,” “an,” and “the” include plural references unless the context clearly dictates otherwise.

Here and throughout the specification and claims, range limitations are combined and interchanged. Such ranges are identified and include all the sub-ranges contained therein unless context or language indicates otherwise. For example, all ranges disclosed herein are inclusive of the endpoints, and the endpoints are independently combinable with each other.

As noted above, turbomachines, particularly, gas turbine engines used in aircraft include at least one shaft connecting, for example, turbines rotors with compressor rotors. During operation, these shafts heat up, and upon shutdown the shafts begin to cool. The cooling of the shaft may be uneven, and uneven cooling of the rotor results in a top portion of the shaft being longer than a bottom portion of the shaft. With the shaft being supported (constrained) by bearings, this length difference creates a bow in the shaft. Bowing of the shaft causes the center of gravity of the shaft to move off of the rotational axis of the shaft, and if rotated under such conditions, the bowed shaft causes vibration. Some amount of vibration may be acceptable when the engine is started (rotated), but greater amounts of bowing result in a greater shift of the center of gravity and vibrations that are not acceptable.

To restart a turbomachine with a shaft that has bowed to levels causing unacceptable vibrations, the turbomachine is "motored" for a period of time. Motoring is a process where the turbomachine is rotated by a separate power source and the turbomachine does not operate on the power of the turbomachines. Fuel is not supplied to the combustor of the turbomachine in this process, and this process is sometimes referred to as dry motoring. A separate motor, such as a starter, is used to rotate the shaft of the turbomachine at a relatively slow speed compared to normal operating speeds of the turbomachine. As the turbomachine is motored, the temperature of the shaft is more evenly distributed, reducing the bow. The turbomachine may be motored until the bow is reduced to levels that produce acceptable levels of vibration. The motoring time is directly proportional to the amount of bow in the shaft and the greater the amount of bow, the greater time amount of motoring time is required.

The embodiments discussed herein include shaft bow mitigation systems that utilize balance weights to counteract the center of gravity shift during bowing. The balance weights are connected to the shaft and are positioned to shift the center of gravity so that the center of gravity is closer to the axis of rotation than the center of gravity would be without the weights in a bowed shaft. These balance weights are adjustable and moved to one position when the turbomachine is shutdown (or starting up) to counteract the bowing of the shaft, and another position when the turbomachine is operating normally, so as not to introduce imbalance into an operating shaft. In some embodiments, the movement of the weights between the operating position and shutdown position is active, and the balance weights are moved by a controller, for example. In other embodiments, the movement of the balance weights is passive and the weights move based on the operating condition of the engine. For example, the weights may move to the operating position by the inertial forces on the weights by rotation of the shaft, and the weights may move to the shutdown position by gravity when the draft is not rotating.

The balance weights discussed herein may be used in any turbomachine, and may be used in any suitable type of gas turbine engine, such as, for example, gas turbine engines used for aircraft, industrial gas turbine engines incorporated into power generation systems, and nautical gas turbine engines.

FIG. 1 is a perspective view of an aircraft 10 that may implement various preferred embodiments. The aircraft 10 includes a fuselage 12, wings 14 attached to the fuselage 12, and an empennage 16. The aircraft 10 also includes a propulsion system that produces a propulsive thrust required to propel the aircraft 10 in flight, during taxiing operations, and the like. The propulsion system for the aircraft 10 shown in FIG. 1 includes a pair of engines 100. In this embodiment, each engine 100 is attached to one of the wings 14 by a pylon 18 in an under-wing configuration. Although the engines 100 are shown attached to the wing 14 in an under-wing configuration in FIG. 1, in other embodiments, the engine 100 may have alternative configurations and be coupled to other portions of the aircraft 10. For example, the engine 100 may additionally or alternatively include one or more aspects coupled to other parts of the aircraft 10, such as, for example, the empennage 16, and the fuselage 12. Although the aircraft 10 shown in FIG. 1 is an airplane, the embodiments described herein may also be applicable to other aircraft 10, including, for example, helicopters and unmanned aerial vehicles (UAV).

Figure 2:
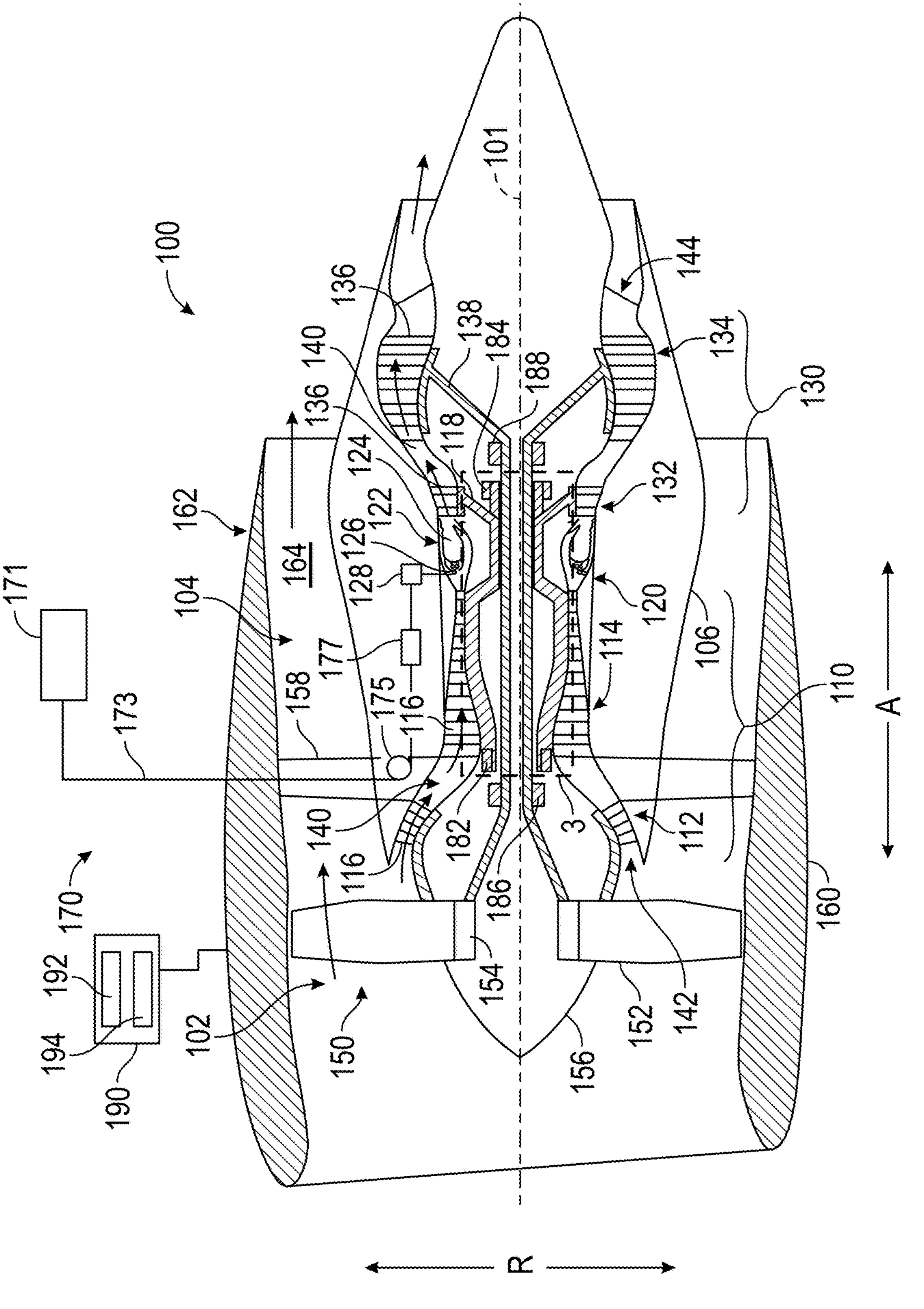
FIG. 2 is a schematic, cross-sectional view, taken along line 2-2 in FIG. 1, of one of the gas turbine engines of the aircraft shown in FIG. 1.

FIG. 2 is a schematic, cross-sectional view of one of the engines 100 used in the propulsion system for the aircraft 10 shown in FIG. 1. The cross-sectional view of FIG. 2 is taken along line 2-2 in FIG. 1. For the embodiment depicted in FIG. 2, the engine 100 is a high bypass turbofan engine. The engine 100 may also be referred to as a turbofan engine 100 herein. The turbofan engine 100 has an axial direction A (extending parallel to a longitudinal centerline 101, shown for reference in FIG. 2), a radial direction R, and a circumferential direction. The circumferential direction C (see FIG. 4) extends in a direction rotating about the axial direction A. The turbofan engine 100 includes a fan section 102 and a turbomachine 104 disposed downstream from the fan section 102.

The turbomachine 104 depicted in FIG. 2 includes a tubular outer casing 106 (also referred to as a housing or a nacelle) that defines an inlet 142. In this embodiment, the inlet 142 is annular. The outer casing 106 encases an engine core that includes, in a serial flow relationship, a compressor section 110 including a booster or a low-pressure (LP) compressor 112 and a high-pressure (HP) compressor 114, a combustion section 120, a turbine section 130 including a high-pressure (HP) turbine 132 and a low-pressure (LP) turbine 134, and a jet exhaust nozzle section 144. The compressor section 110, the combustion section 120, and the turbine section 130 together define at least in part a core air flow path 140 extending from the inlet 142 to the jet exhaust nozzle section 144.

Each of the LP compressor 112 and the HP compressor 114 may include a plurality of compressor rotors 116. The compressor rotors 116 are shown schematically in FIG. 2 in the core air flow path 140, and for clarity, only one compressor rotor 116 is labeled in each of the LP compressor 112 and the HP compressor 114. The compressor rotor 116 may include a disk **116*a* (FIGS. 3 to 5) and a plurality of compressor blades 116*b* (FIGS. 3 to 5) radially extending from the disk. Other configurations of the compressor rotor 116 may be used, including, for example, blisks where the disk 116*a* and the compressor blades 116*b* are integrally formed with each other to be a single piece. Each compressor rotor 116 (or stage) may be used to sequentially compress the air flowing through the core air flow path 140**.

Each of the HP turbine 132 and the LP turbine 134 may include a plurality of turbine rotors 136. The turbine rotors 136 are shown schematically in FIG. 2 as a line in the core air flow path 140, and for clarity, only one turbine rotor 136 is labeled in each of the HP turbine 132 and the LP turbine 134. Any suitable configuration for a turbine rotor 136 may be used including, for example, a disk and a plurality of turbine blades extending from the disk. Combustion gases are discharged from a combustion chamber 124 of a combustor 122 of the combustion section 120, as discussed further below. These combustion gases may be directed by a nozzle into the turbine rotors 136 of the HP turbine 132 and then the turbine rotors 136 of the LP turbine 134, and the combustion gases drive (rotate) the turbine rotors 136 of the HP turbine 132 and the LP turbine 134.

The turbofan engine (turbomachine 104) further includes one or more drive shafts. More specifically, the turbofan engine includes a high-pressure (HP) shaft 118 drivingly connecting the HP turbine 132 to the HP compressor 114, and a low-pressure (LP) shaft 138 drivingly connecting the LP turbine 134 to the LP compressor 112. The HP shaft 118 and the LP shaft 138 may also be referred to as spools. More specifically, the turbine rotors 136 of the HP turbine 132 are connected to the HP shaft 118, and the compressor rotors 116 of the HP compressor 114 are connected to the HP shaft 118. When the turbine rotors 136 of the HP turbine 132 are rotated by the combustion gases flowing through the core air flow path 140, the turbine rotors 136 of the HP turbine 132 rotate the compressor rotors 116 of the HP compressor 114 via the HP shaft 118. Similarly, the turbine rotors 136 of the LP turbine 134 are connected to the LP shaft 138, and the compressor rotors 116 of the LP compressor 112 are connected to the LP shaft 138. When the turbine rotors 136 of the LP turbine 134 are rotated by the combustion gases flowing through the core air flow path 140, the turbine rotors 136 of LP turbine 134 rotate the compressor rotors 116 of the LP compressor 112 via the LP shaft 138.

Each of the HP shaft 118 and LP shaft 138 may be supported by a plurality of bearings. For example, the HP shaft 118 is supported by a forward bearing 182 and a rear bearing 184, and the LP shaft 138 is supported by a forward bearing 186 and a rear bearing 188. Although only two bearings are shown in FIG. 2 for each of the HP shaft 118 and LP shaft 138, more than two bearings, e.g., three or four bearings, forward and/or aft of the respective illustrated locations, may be arranged to support the HP shaft 118 or the LP shaft 138 at the respective positions, and may be evenly spaced or irregularly spaced depending on the geometry of the bearing supporting structure, and available space and clearances.

The fan section 102 shown in FIG. 2 includes a fan 150 having a plurality of fan blades 152 coupled to a disk 154. The fan blades 152 and the disk 154 are rotatable, together, about the longitudinal centerline (axis) 101 by the LP shaft 138. The LP compressor 112 may also be directly driven by the LP shaft 138, as depicted in FIG. 2. The disk 154 is covered by a rotatable front hub 156 aerodynamically contoured to promote an airflow through the plurality of fan blades 152. Further, an annular fan casing or an outer nacelle 160 circumferentially surrounds the fan 150 and/or at least a portion of the turbomachine 104. The nacelle 160 is supported relative to the turbomachine 104 by a plurality of circumferentially spaced outlet guide vanes 158. A downstream section 162 of the nacelle 160 extends over an outer portion of the turbomachine 104 so as to define a bypass airflow passage 164 therebetween.

The turbofan engine 100 is operable with a fuel system 170 and receives a flow of fuel from the fuel system 170. The fuel system 170 includes a fuel delivery assembly 173 providing the fuel flow from a fuel tank 171 to the turbofan engine 100, and, more specifically, to a plurality of fuel nozzles 126 that inject fuel into the combustion chamber 124 of the combustor 122 of the combustion section 120. The components of the fuel system 170, and, more specifically, the fuel tank 171, is an example of a fuel source that provides fuel to the fuel nozzles 126. The fuel delivery assembly 173 includes tubes, pipes, conduits, and the like, to fluidly connect the various components of the fuel system 170 to the engine 100. The fuel tank 171 is configured to store the fuel, and the fuel is supplied from the fuel tank 171 to the fuel delivery assembly 173. The fuel delivery assembly 173 is configured to carry the fuel between the fuel tank 171 and the engine 100 and, thus, provides a flow path (fluid pathway) of the fuel from the fuel tank 171 to the engine 100.

The fuel system 170 includes at least one fuel pump fluidly connected to the fuel delivery assembly 173 to induce the flow of the fuel through the fuel delivery assembly 173 to the engine 100. One such pump is a main fuel pump 175. The main fuel pump 175 is a high-pressure pump that is the primary source of pressure rise in the fuel delivery assembly 173 between the fuel tank 171 and the engine 100. The main fuel pump 175 may be configured to increase a pressure in the fuel delivery assembly 173 to a pressure greater than a pressure within the combustion chamber 124 of the combustor 122.

The fuel system 170 also includes a fuel metering unit 177 in fluid communication with the fuel delivery assembly 173. Any suitable fuel metering unit 177 may be used including, for example, a metering valve. The fuel metering unit 177 is positioned downstream of the main fuel pump 175 and upstream of a fuel manifold 128 and configured to distribute fuel to the fuel nozzles 126. The fuel system 170 is configured to provide the fuel to the fuel metering unit 177, and the fuel metering unit 177 is configured to receive fuel from the fuel tank 171. The fuel metering unit 177 is further configured to provide a flow of fuel to the engine 100 in a desired manner. More specifically, the fuel metering unit 177 is configured to meter the fuel and to provide a desired volume of fuel, at, for example, a desired flow rate, to the fuel manifold 128 of the engine 100. The fuel manifold 128 is fluidly connected to the fuel nozzles 126 and distributes (provides) the fuel received to the plurality of fuel nozzles 126, where the fuel is injected into the combustion chamber 124 of the combustor 122, mixed with compressed air from the compressor section 110 to form a fuel and air mixture, and combusted, generating combustion products (combustion gases). Adjusting the fuel metering unit 177 changes the volume of fuel provided to the combustion chamber 124 and, thus, changes the amount of propulsive thrust produced by the engine 100 to propel the aircraft 10.

The engine 100 may also include an engine controller 190. The engine controller 190 is configured to operate various aspects of the engine 100, including, in some embodiments, the bow mitigation systems 200, 202, and 204 (see FIGS. 3, 8, and 9), discussed herein. In this embodiment, the engine controller 190 is a computing device having one or more processors 192 and one or more memories 194. The processor 192 can be any suitable processing device, including, but not limited to, a microprocessor, a microcontroller, an integrated circuit, a logic device, a programmable logic controller (PLC), an application-specific integrated circuit (ASIC), and/or a Field Programmable Gate Array (FPGA). The memory 194 can include one or more computer-readable media, including, but not limited to, non-transitory computer-readable media, a computer-readable non-volatile medium (e.g., a flash memory), a RAM, a ROM, hard drives, flash drives, and/or other memory devices.

The memory 194 can store information accessible by the processor 192, including computer-readable instructions that can be executed by the processor 192. The instructions can be any set of instructions or a sequence of instructions that, when executed by the processor 192, causes the processor 192 and the engine controller 190 to perform operations. In some embodiments, the instructions can be executed by the processor 192 to cause the processor 192 to complete any of the operations and functions for which the engine controller 190 is configured, as will be described further below. The instructions can be software written in any suitable programming language, or can be implemented in hardware. Additionally, and/or alternatively, the instructions can be executed in logically and/or virtually separate threads on the processor 192. The memory 194 can further store data that can be accessed by the processor 192.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between components and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The turbofan engine 100 discussed herein is, of course, provided by way of example only. In other embodiments, any other suitable engine may be utilized with aspects of the present disclosure. For example, in other embodiments, the engine may be any other suitable gas turbine engine, such as a turboshaft engine, a turboprop engine, a turbojet engine, an unducted single fan engine, and the like. In such a manner, in other embodiments, the gas turbine engine may have other suitable configurations, such as other suitable numbers or arrangements of shafts, compressors, turbines, fans, etc. Further, although the turbofan engine 100 is shown as a direct drive, fixed-pitch turbofan engine 100, in other embodiments, a gas turbine engine may be a geared gas turbine engine (i.e., including a gearbox between the fan 150 and a shaft driving the fan, such as the LP shaft 138), may be a variable pitch gas turbine engine (i.e., including a fan 150 having a plurality of fan blades 152 rotatable about their respective pitch axes), etc. Further, still, in alternative embodiments, aspects of the present disclosure may be incorporated into, or otherwise utilized with, any other type of engine, such as reciprocating engines. Additionally, in still other exemplary embodiments, the exemplary turbofan engine 100 may include or be operably connected to any other suitable accessory systems.

Figure 3:
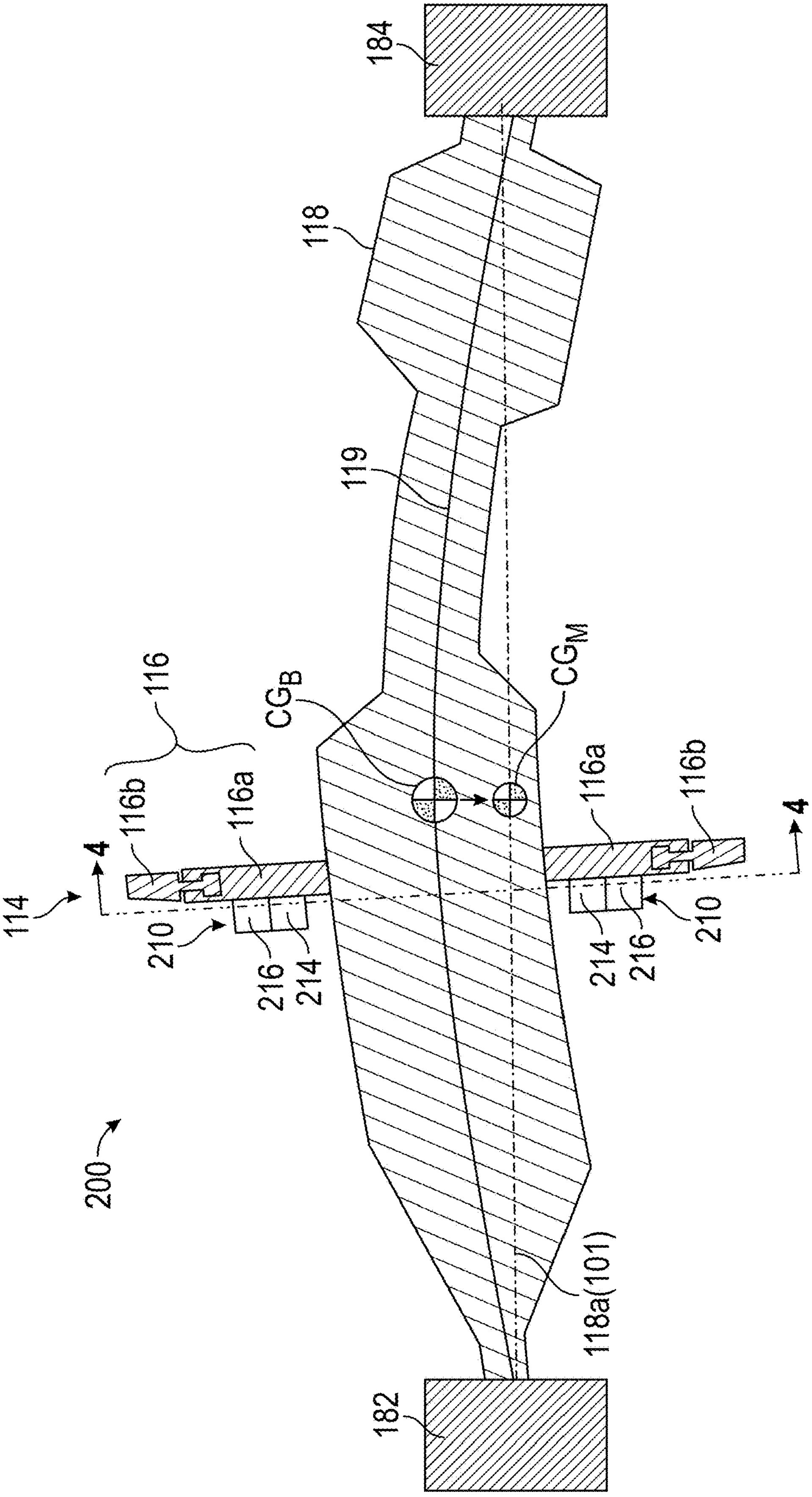
FIG. 3 is a schematic, detail cross-sectional view, showing detail 3 in FIG. 2, of a shaft the gas turbine engine shown in FIG. 2, having a bow mitigation system according to an embodiment.

FIG. 3 is a schematic, detail cross-sectional view of the HP shaft 118, showing detail 3 in FIG. 2. Some details of the turbomachine 104 are omitted for clarity. When the turbofan engine 100 (FIG. 2) is shut down after operating for a period of time, the components of the turbofan engine 100 begin to cool. The HP shaft 118 also begins to cool, but the HP shaft 118 may not cool down evenly. Uneven cooling of the rotor may result in a top portion of the HP shaft 118 being longer than a bottom portion of the shaft. The HP shaft 118 is supported by the forward bearing 182 at a forward portion of the HP shaft 118, and the HP shaft 118 is supported by the rear bearing 184 at a rear portion of the HP shaft 118. With the HP shaft 118 being supported (constrained) by the forward bearing 182 and the rear bearing 184, the length difference from uneven cooling creates a bow in the HP shaft 118. As illustrated in FIG. 3, a centerline 119 of the HP shaft 118 is bowed upward relative to a rotational axis 118*a* of the HP shaft 118. In this embodiment, the rotational axis 118*a* is coincident with the longitudinal centerline 101 of the turbofan engine 100.

Figure 5:
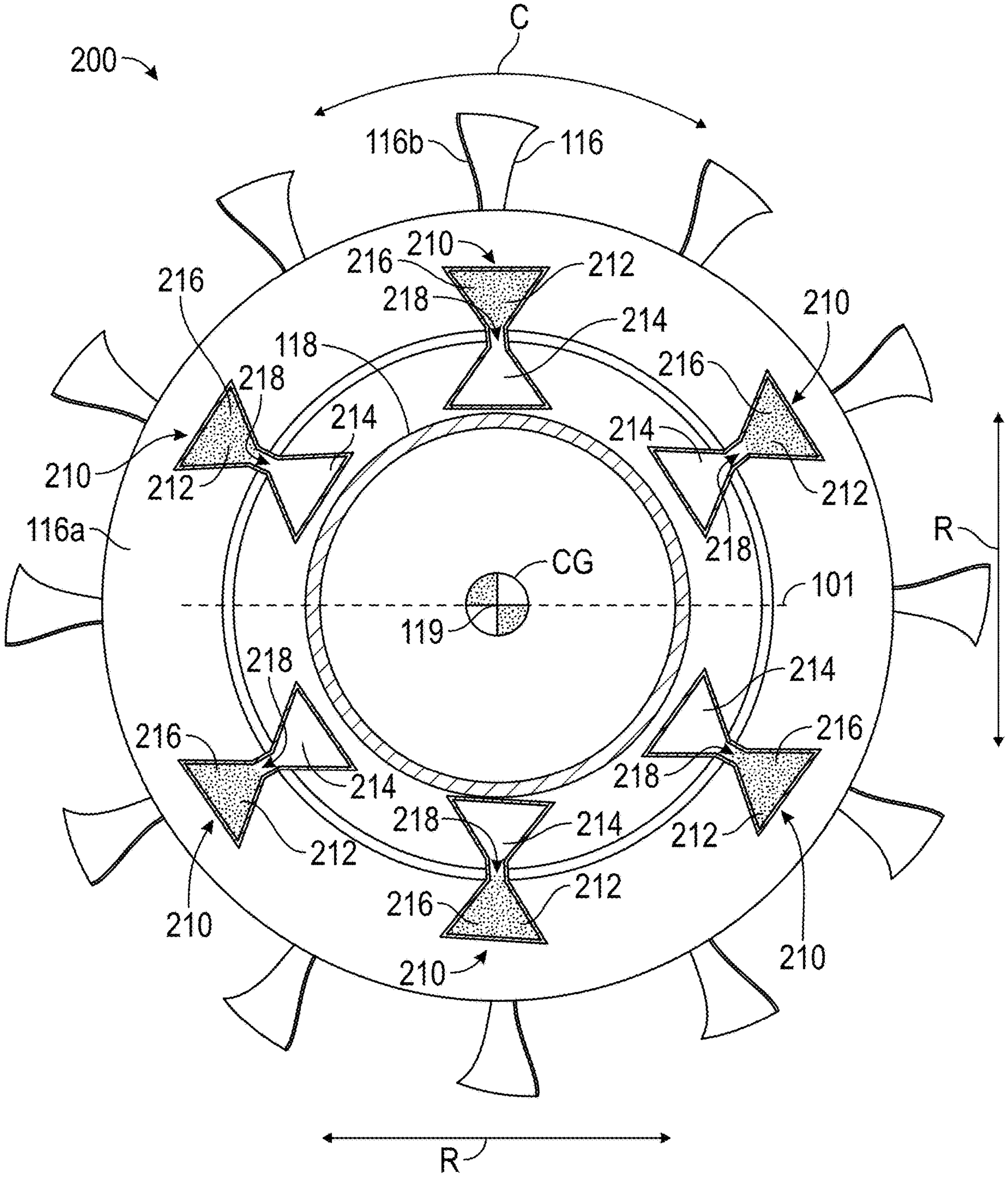
FIG. 5 is a cross-sectional view of the shaft, taken along line 4-4 in FIG. 3, showing the bow mitigation system in an operating condition.

The HP shaft 118 includes a center of gravity CG (see FIG. 5). Preferably, the center of gravity CG of the HP shaft 118 is located on the centerline 119 of the HP shaft 118 such that, during normal operation when the centerline 119 is aligned with the rotational axis 118*a*, the rotational axis 118*a* passes through the center of gravity CG of the HP shaft 118. This condition provides for balanced rotation and prevents vibration. Bowing of the HP shaft 118 causes the center of gravity CG of the HP shaft 118 to move off of the rotational axis 118*a* of the shaft, as schematically indicated by the bowed center of gravity CGB. If rotated under such conditions, the bowed HP shaft 118 causes vibration. As noted above and as will be discussed further below, some amount of vibration may be acceptable when the turbofan engine 100 and, more specifically, the HP shaft 118 are started (rotated), but greater amounts of bowing result in a greater shift of the bowed center of gravity CGB from the rotational axis 118*a* and results in vibrations that are not acceptable if the HP shaft 118 is operated (rotated) in the bowed condition. To mitigate this bowed center of gravity CGB relative to the rotational axis 118*a*, the HP shaft 118 includes a bow mitigation system 200. The bow mitigation system 200 moves the center of gravity (a mitigated center of gravity CGM) in a direction opposite to the bow. In the embodiment shown in FIG. 3, the bow mitigation system 200 moves the center of gravity of the HP shaft 118 from the bowed center of gravity CGB downward to the mitigated center of gravity CGM, and the mitigated center of gravity CGM is closer to the rotational axis 118*a* than the bowed center of gravity CGB. This movement of the center of gravity off of the centerline 119 of the HP shaft 118 is referred to herein as the static imbalance of the HP shaft 118.

Figure 4:
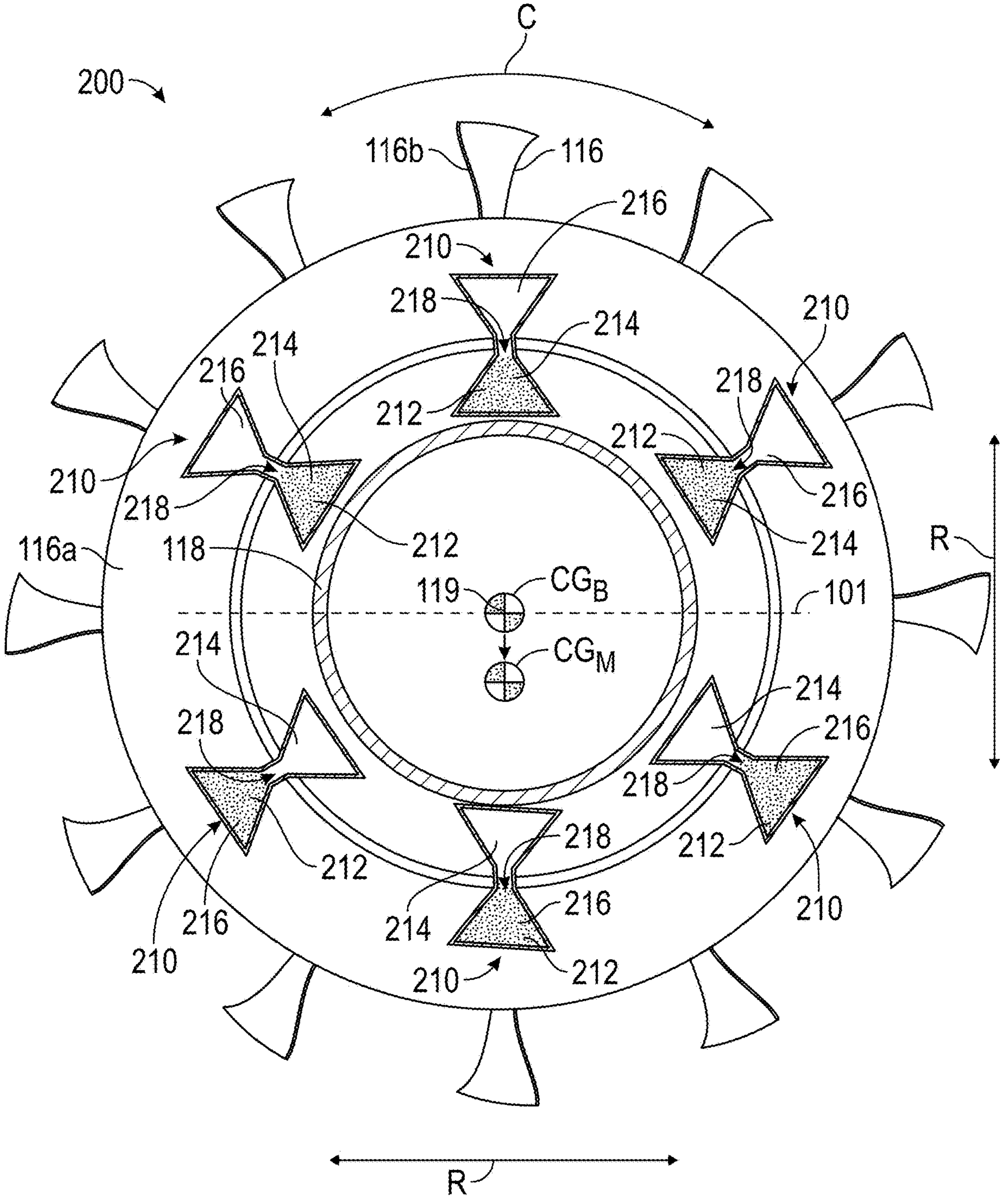
FIG. 4 is a cross-sectional view of the shaft, taken along line 4-4 in FIG. 3, showing the bow mitigation system in a shutdown condition.

The bow mitigation system 200 of this embodiment is shown in FIGS. 3 to 5. FIGS. 4 and 5 are cross-sectional views of the HP shaft 118, taken along line 4-4 in FIG. 3. FIG. 4 shows the HP shaft 118 and the bow mitigation system 200 in a shutdown condition, and FIG. 5 shows the HP shaft 118 and the bow mitigation system 200 in an operating condition. The bow mitigation system 200 of this embodiment includes a plurality of adjustable balance weight assemblies 210. The adjustable balance weight assemblies 210 are arrayed circumferentially around the HP shaft 118 and connected to this HP shaft 118 in this arrangement. The adjustable balance weight assemblies 210 are located axially (in the axial direction of the HP shaft 118) between the forward bearing 182 and the rear bearing 184. In this embodiment, the adjustable balance weight assemblies 210 are located within the compressor section 110 (FIG. 2), and more specifically, within the HP compressor 114. As noted above, each compressor rotor 116 includes a disk 116*a* and a plurality of compressor blades 116*b*. The adjustable balance weight assemblies 210 are attached to the disk 116*a* of one of the compressor rotors 116 of the HP compressor 114 in this embodiment and, thereby, connected to the HP shaft 118. The adjustable balance weight assemblies 210 may be attached to the disk 116*a* in any suitable manner. In this embodiment, each adjustable balance weight assembly 210 is directly attached to the disk 116*a* in a manner similar to the way a vortex tube is attached to the disk 116*a*.

Each adjustable balance weight assembly 210 includes a movable balance weight 212 that is movable to change the center of gravity from the bowed center of gravity CGB to the mitigated center of gravity $CG_M$ as discussed above. The movable balance weight 212 may be movable between a first position and a second position to change the center of gravity CG of the HP shaft 118. In this embodiment, each adjustable balance weight assembly 210 includes a plurality of chambers. Each adjustable balance weight assembly 210 may include a first chamber and at least one at least one additional chamber. In this embodiment, one chamber is an inner chamber 214 and the other chamber is an outer chamber 216. The outer chamber 216 is positioned radially outward of the inner chamber 214. In this embodiment, the movable balance weight 212 is a flowable mass and the inner chamber 214 is fluidly connected to the outer chamber 216 by a flow passage 218 to allow the flowable mass to flow between the inner chamber 214 and the outer chamber 216. The flowable mass may be a powder comprising a plurality of particles. Examples of suitable powders include metal particles and sand. The flowable mass alternatively may be a liquid, such as mercury, for example. The flowable mass alternatively may be a semi-solid viscous mass, such as shear thickening fluid, silicone grease, or aero gel, for example. The flowable mass may be any combination of these examples, such as, for example the plurality of particles suspended within a liquid. Each adjustable balance weight assembly 210 has an hourglass shape with a radially inner portion of the inner chamber 214 being wider than a radially outer portion of the inner chamber 214, and a radially outer portion of the outer chamber 216 being wider than a radially inner portion of the outer chamber 216. The outer portion of the inner chamber 214 is connected to the inner portion of the outer chamber 216 by the flow passage 218. The flow passage 218 is the narrowest portion of the adjustable balance weight assembly 210, in this embodiment, and limits (regulates) the flow of the movable balance weight 212 (flowable mass) between the inner chamber 214 and the outer chamber 216.

FIG. 4 shows the bow mitigation system 200 in a shutdown condition. In this embodiment, movement of the movable balance weight 212 between the inner chamber 214 and the outer chamber 216 is passive. There are no valves, motors, pumps, or other active system to move the movable balance weight 212. Instead, positioning of the movable balance weight 212, which is a flowable mass in this embodiment, between the inner chamber 214 and the outer chamber 216 is driven by gravity in the shutdown condition, when bowing of the HP shaft 118 may occur. When the HP shaft 118 is shutdown, the HP shaft 118 does not rotate, and the movable balance weights 212 in the adjustable balance weight assemblies 210 located on a top portion of the HP shaft 118 (above the longitudinal centerline 101) flow downward through the flow passage 218 from the outer chamber 216 to the inner chamber 214. This downward flow of the movable balance weight 212 is movement (positioning) of the movable balance weight 212 in a radially inward direction.

To the extent the movable balance weight 212 is not already positioned in the outer chamber 216, the movable balance weights 212 in the adjustable balance weight assemblies 210 located on a bottom portion of the HP shaft 118 (below the longitudinal centerline 101) also flow downward through the flow passage 218, flowing from the inner chamber 214 to the outer chamber 216. This downward flow of the movable balance weight 212 is movement (positioning) of the movable balance weight 212 in a radially outward direction. The center of gravity of the HP shaft 118 moves downward from the bowed center of gravity $CG_B$ to the mitigated center of gravity $CG_M$ with the radially inward movement of the movable balance weight 212 for the adjustable balance weight assemblies 210 located on the top portion of the HP shaft 118 and the radially outward movement of the movable balance weight 212 for the adjustable balance weight assemblies 210 located on the bottom portion of the HP shaft 118. The bow mitigation system 200 of this embodiment positions the movable balance weight 212 of the adjustable balance weight assemblies 210 located on the top portion of the HP shaft 118 radially inward and positions the movable balance weight 212 of the adjustable balance weight assemblies 210 located on the bottom portion of the HP shaft 118 radially outward in the shutdown condition, producing the static imbalance of the HP shaft 118.

FIG. 5 shows the bow mitigation system 200 in an operating condition. In operation, the bow mitigation system 200 positions the movable balance weight 212 of each adjustable balance weight assembly 210 at a position to locate the center of gravity CG on the centerline 119 of the HP shaft 118. As noted above, the movement of the movable balance weight 212 between the inner chamber 214 and the outer chamber 216 is passive in this embodiment. During startup or while operating, the HP shaft 118 and the adjustable balance weight assemblies 210 rotate. When the HP shaft 118 and the adjustable balance weight assemblies 210 rotate, inertial forces act on the movable balance weight 212 (flowable mass) causing the movable balance weight 212 to flow radially outward, and, thus, to the extent the movable balance weight 212 is located in the inner chamber 214, the movable balance weight 212 flows from the inner chamber 214 through the flow passage 218 into the outer chamber 216 and centers the center of gravity CG at the rotational axis 118*a* (see FIG. 3). The movable balance weights 212 are, thus, located at a radially outward position when the HP shaft 118 is in an operating condition.

Figure 6:
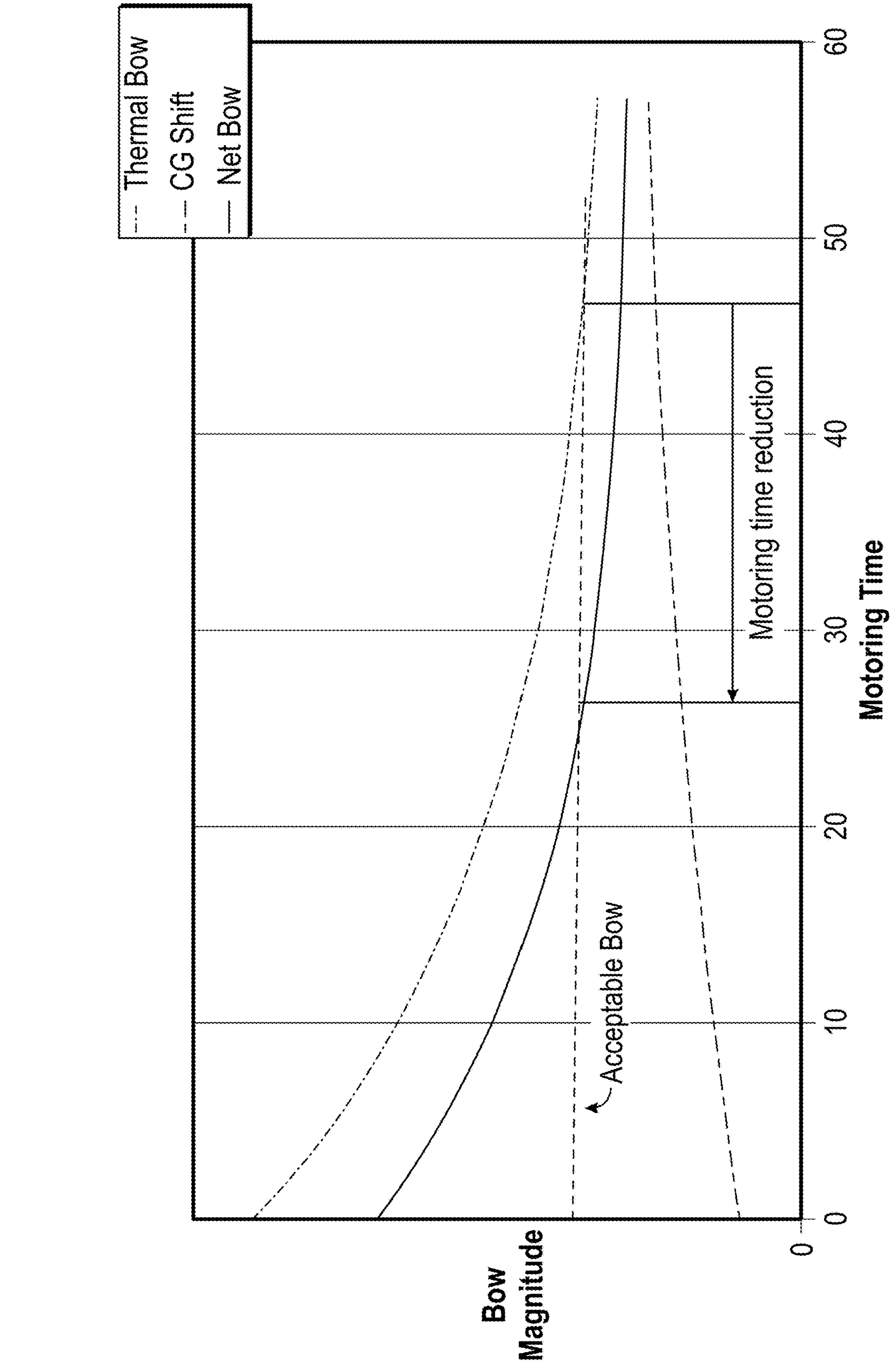
FIG. 6 is a graph showing the magnitude of bowing in the shaft as a function of motoring time.

FIG. 6 is a graph showing the magnitude of bowing in the HP shaft 118 as a function of motoring time. As discussed above, to restart the turbomachine 104 with an HP shaft 118 that is thermally bowed, the turbomachine 104 is motored for a period of time, referred to herein as motoring time. The y-axis is the magnitude of bowing in the HP shaft 118, and the x-axis is the amount of time that the turbomachine 104 has been motored. An HP shaft 118 without the bow mitigation system 200 is shown by the upper line (dash-dot line labeled thermal bow in FIG. 6). The magnitude of bow in the HP shaft 118 is the greatest at time zero and decreases as the HP shaft 118 is motored (motoring time). In the illustration shown in FIG. 6, the unmitigated HP shaft 118 needs to be motored for at least approximately forty-seven minutes before the amount of bow in the HP shaft 118 is reduced to a level that is acceptable, which is a level that is below the acceptable bow line (indicated by the horizontal broken line). The static imbalance of the HP shaft 118 or the center of gravity shift (CG shift) produced by the bow mitigation system 200 can be estimated as a negative bow as shown by the bottom line (dash-long dash line labeled CG shift in FIG. 6). Summing the thermal bow line with the CG shift line results in the net bow line indicated by the solid line in FIG. 6. The net bow line (mitigated bow) produced by the bow mitigation system 200 results in the net bow crossing the acceptable bow line between twenty and thirty minutes. In this example, the effect of the bow mitigation system 200 reduces the motoring time by about twenty minutes.

Figure 7:
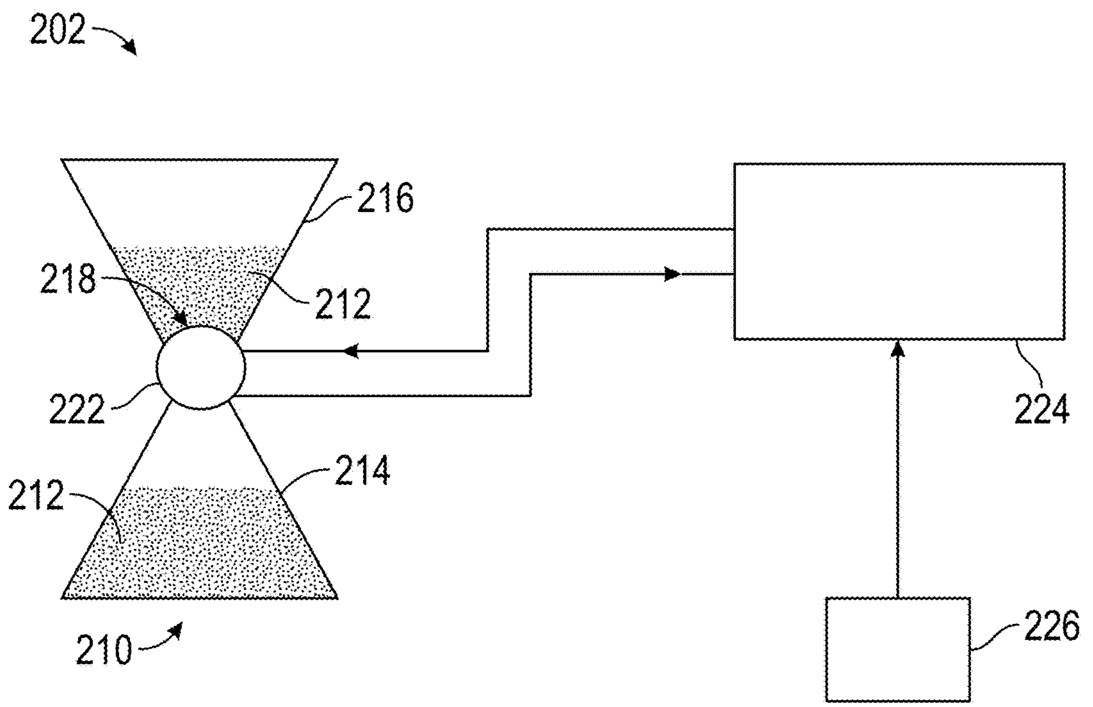
FIG. 7 shows a bow mitigation system according to another embodiment.

FIG. 7 shows a bow mitigation system 202 according to another embodiment. The bow mitigation system 202 is similar to the bow mitigation system 200 discussed above, and the discussion of the bow mitigation system 200 above applies to the bow mitigation system 202 of this embodiment. The same reference numerals of the bow mitigation system 200 discussed above will be used to refer to the same or similar components in this embodiment and a detailed description of these components is omitted here.

In this embodiment, the movement of the movable balance weight 212 between the inner chamber 214 and the outer chamber 216 is active. The adjustable balance weight assembly 210 includes a valve 222 located between the inner chamber 214 and the outer chamber 216 to control the movement (flow) of the movable balance weight 212, which is also a flowable mass in this embodiment. The valve 222 may be positioned in the flow passage 218 to control the flow of the flowable mass though the flow passage 218. The valve 222 may include a closed position and at least one open position. In some embodiments, the valve 222 includes a plurality of open positions. In the open positions, the inner chamber 214 and the outer chamber 216 are fluidly connected to each other so that the flowable mass can flow through the flow passage 218 between the inner chamber 214 and the outer chamber 216. When the valve 222 includes a plurality of open positions, the valve 222 controls the size of the fluid connection between the inner chamber 214 and the outer chamber 216 to control the rate of flow through the flow passage 218. In the closed position the valve 222 isolates (fluidly disconnects) the inner chamber 214 and the outer chamber 216 from each other.

Any suitable valve 222 may be used including a programable logic control valve. The valve 222 is communicatively coupled to a controller 224, which, in this embodiment, is the engine controller 190 (FIG. 2). The controller 224 may, however, be a standalone controller or other suitable controller of the turbofan engine 100 (FIG. 2) or aircraft 10 (FIG. 1). The controller 224 may be communicatively coupled to the valve 222 by any suitable connection, including wired connections or wireless connections using a corresponding communication protocol. Here, when the valve 222 is located on the rotating components of the turbomachine 104 (FIG. 2), the valve 222 and the controller 224 are preferably connected by a wireless connection using Bluetooth®, Wi-Fi®, or other short range wireless protocol. The valve 222 and the controller 224 may thus each include a transmitter and a receiver to wirelessly communicate with each other. The controller 224 is configured to operate the valve 222 and to control the movement (flow) of the movable balance weight 212.

The controller 224 is configured to receive inputs indicating the bow of the HP shaft 118 (FIG. 2) and/or the position of the movable balance weight 212. The controller 224 may be communicatively coupled to sensors 226 that provide these inputs. The controller 224 may be directly, communicatively, coupled to the sensors 226. The controller 224 may also be indirectly coupled to such sensors 226 and receive inputs from another source, such as a flight controller for the aircraft 10 (FIG. 1). Such sensors 226 may include, for example, accelerometers and clearance probes mounted on the adjustable balance weight assembly 210 or other portions of the turbomachine 104 (FIG. 2) to determine the bow direction and the magnitude of the HP shaft 118 and the static imbalance produced by the bow mitigation system 202.

Figure 8:
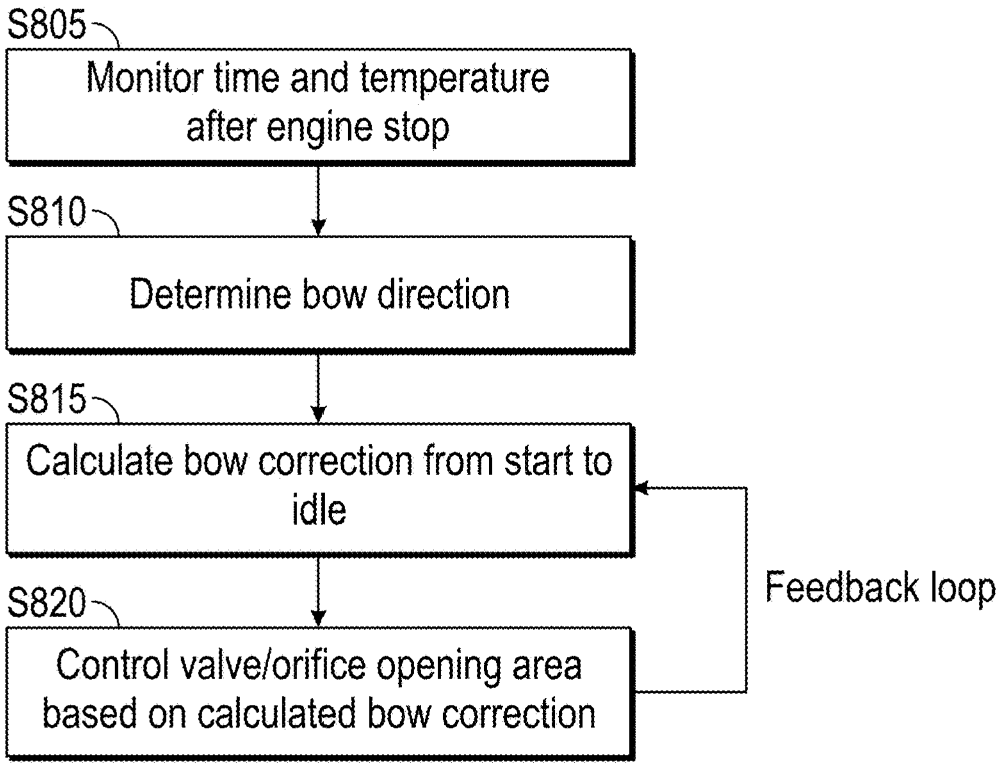
FIG. 8 is a flow chart showing operation of the bow mitigation system shown in FIG. 7.

FIG. 8 is a flow chart showing operation of the bow mitigation system 202 of FIG. 7. In step S805, the controller 224 determines the time after the HP shaft 118 (FIG. 2) has stopped rotating after an operating condition (time after shutdown). The controller 224 may determine the time after shutdown by receiving an input of this value or operating a clock (timer) after counting the time after executing a shutdown operation. The controller 224 also may monitor the temperature of the HP shaft 118 and/or other suitable temperature that is indictive of the bow of the HP shaft 118 in Step S805. A temperature sensor may be one of the sensors 226 communicatively coupled to the controller 224 to provide this temperature. In step S810, the controller 224 determines the bow direction and/or magnitude of the bow of the HP shaft 118. When equipped with sensors 226 to monitor the bow of the HP shaft 118, the controller may use inputs from these sensors 226 to determine the bow direction and the magnitude. Alternatively, or additionally, the controller 224 may calculate the bow direction and the magnitude based on the time after shutdown and the temperature monitored in step S805. In step S815, the controller 224 calculates the amount of bow correction (static imbalance) needed to facilitate start-up based on the bow direction and the magnitude determined in step S810. If the controller 224 has previously positioned the movable balance weight 212, the controller 224 may take into account any existing static imbalance in calculating the amount of bow correction needed in step S815. In step S820, the controller 224 moves the movable balance weight 212 to generate the desired static imbalance, such as by operating the valve 222 to allow an appropriate amount of the flowable mass (movable balance weight 212) to move from the outer chamber 216 to the inner chamber 214 in the adjustable balance weight assembly 210 located on the top portion of the HP shaft 118. Any one or all of steps S810 to S820 may be performed at start-up.

The process shown in FIG. 8 also may include a feedback loop. After step S820, the process may return to step S815 to verify the desired amount of static imbalance has been achieved. If the controller 224 determines additional adjustments are necessary in step S815, the process returns to step S820 to reposition the movable balance weight 212.

FIGS. 9 to 12 show a bow mitigation system 204 according to another embodiment. The bow mitigation system 204 of this embodiment is similar to the bow mitigation system 200 discussed above, and the discussion of the bow mitigation system 200 above applies to the bow mitigation system 204 of this embodiment. The same reference numerals of the bow mitigation system 200 discussed above will be used to refer to the same or similar components in this embodiment and a detailed description of these components is omitted here. The movable balance weight 212 of this embodiment is also a flowable mass as in the embodiments discussed above.

Figure 9:
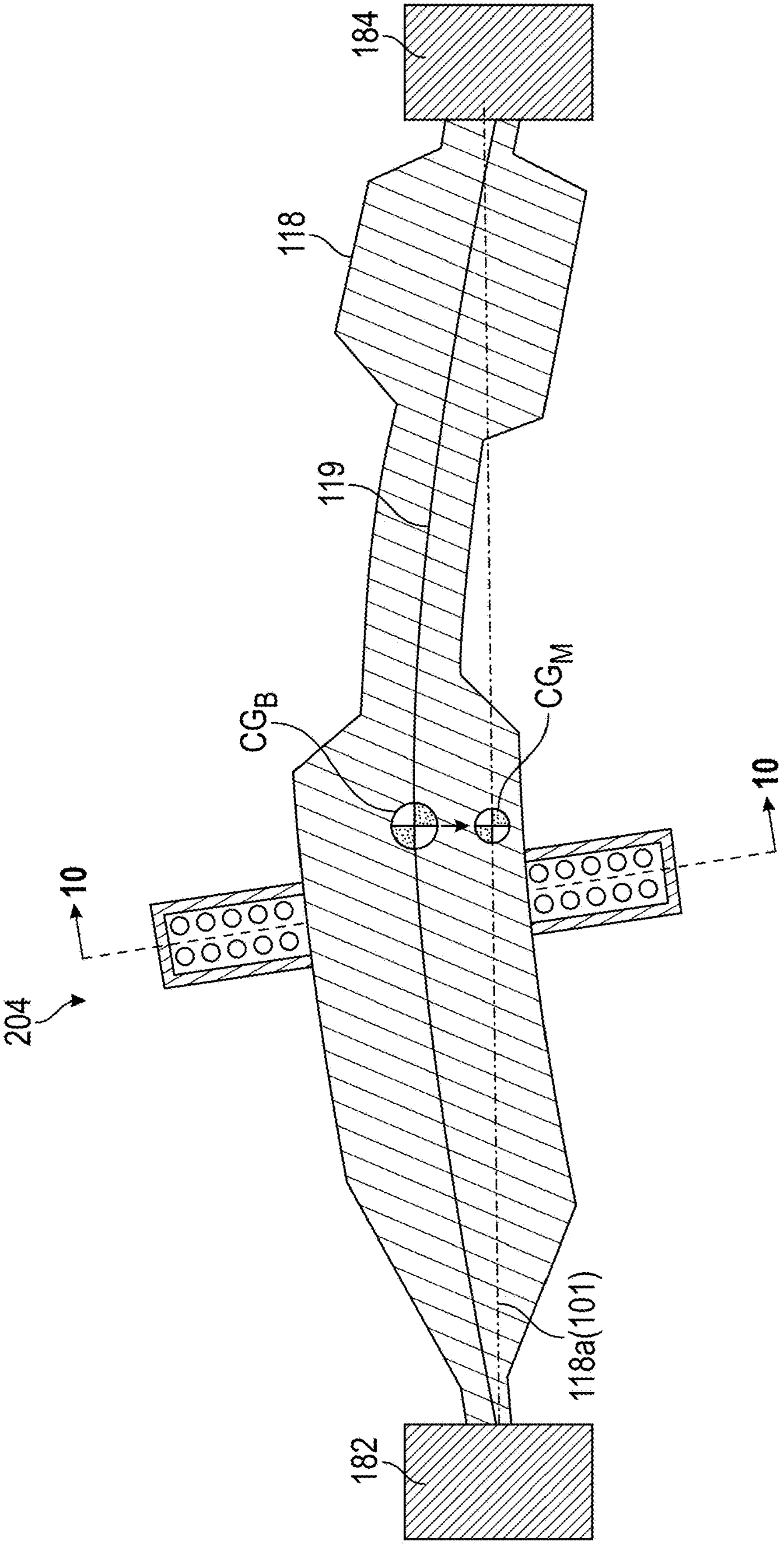
FIG. 9 is a schematic cross-sectional view of a shaft of a gas turbine engine having a bow mitigation system according to a further embodiment.
Figure 10:
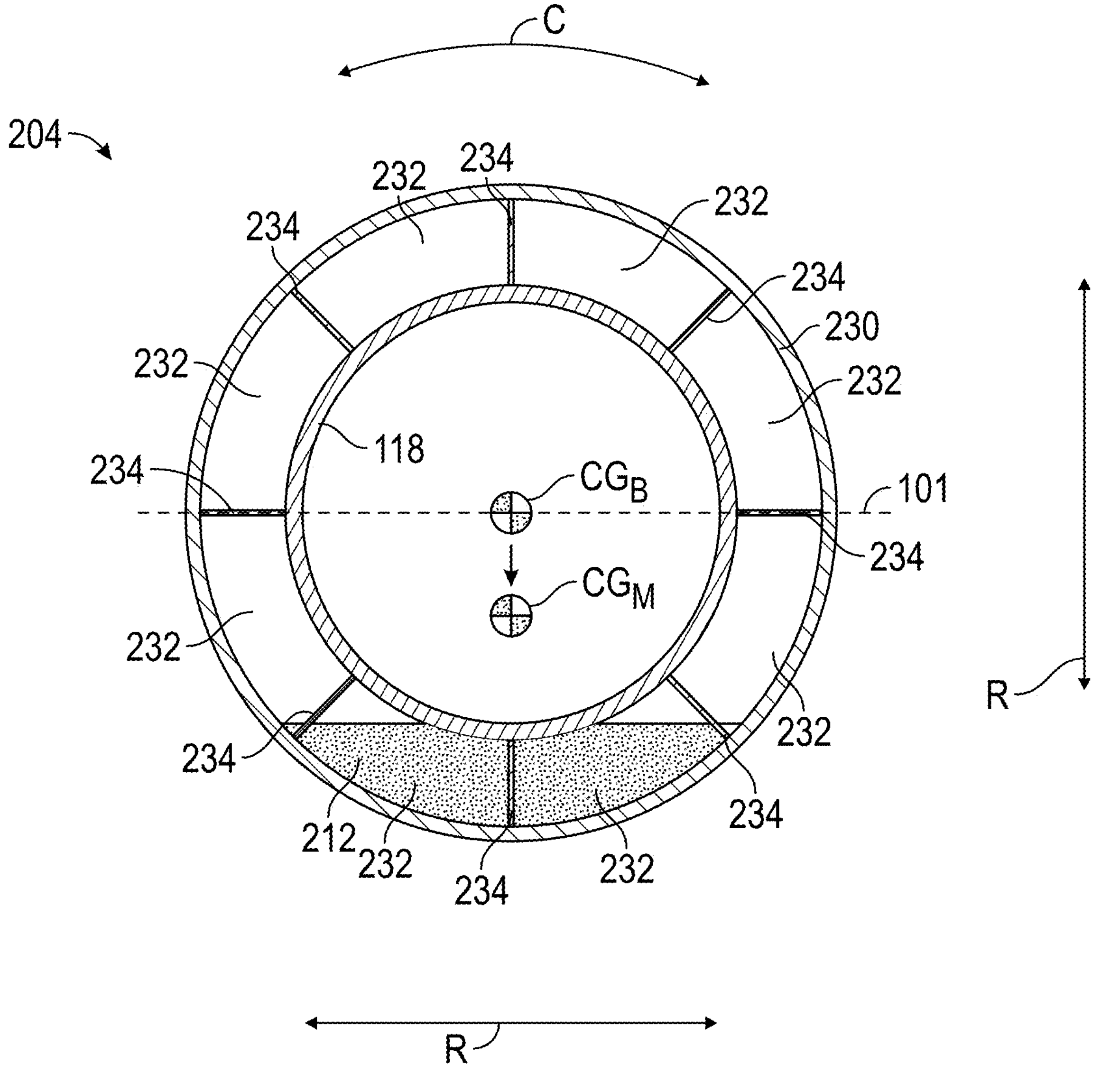
FIG. 10 is a cross-sectional view of the shaft, taken along line 10-10 in FIG. 9, showing the bow mitigation system in a shutdown condition.
Figure 11:
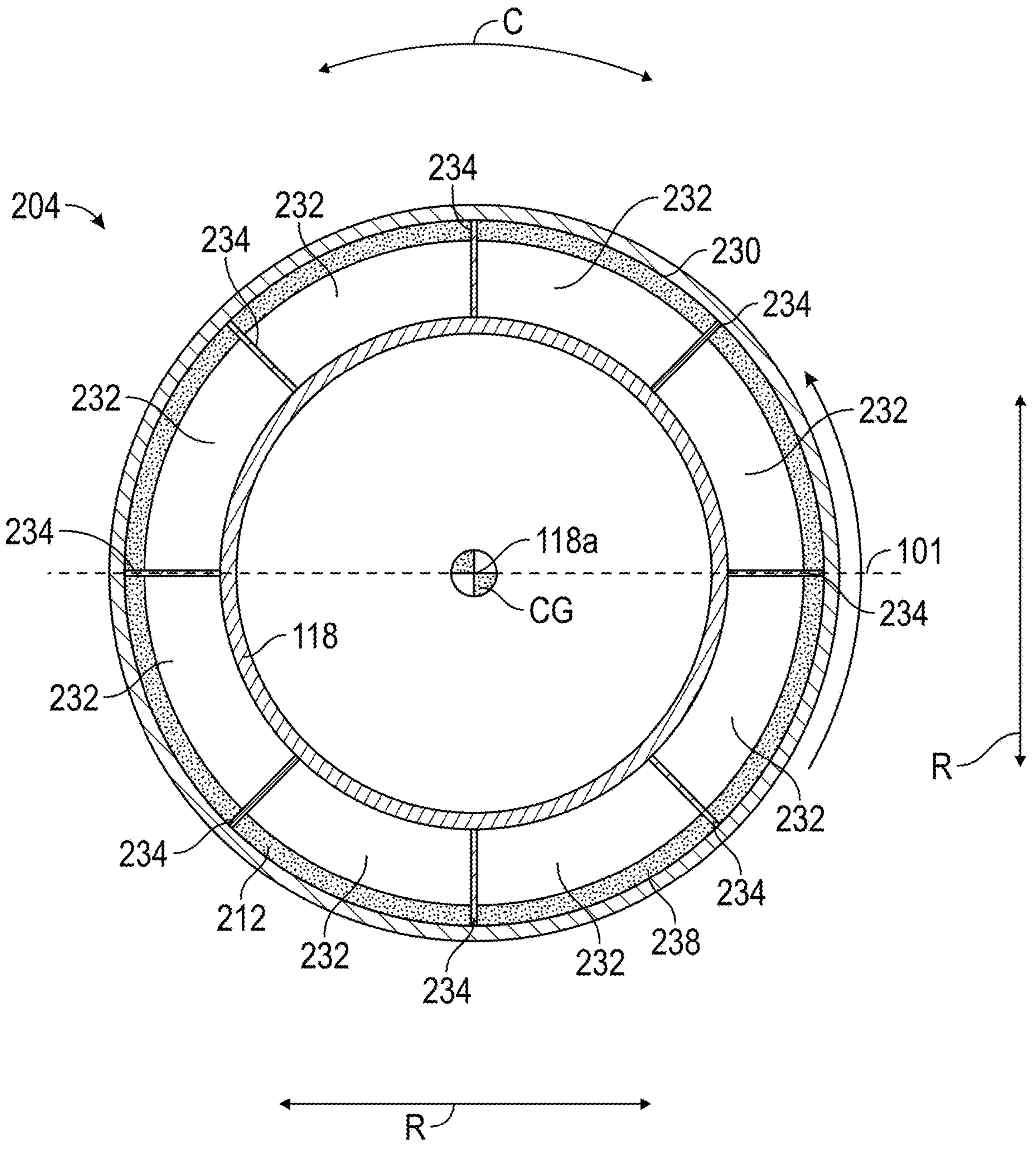
FIG. 11 is a cross-sectional view of the shaft, taken along line 10-10 in FIG. 9, showing the bow mitigation system in an operating condition.

FIG. 9 is a schematic cross-sectional view of the HP shaft 118. FIG. 9 is a similar perspective as FIG. 3 that shows detail 3 in FIG. 2, but FIG. 9 shows the bow mitigation system 204 of this embodiment. FIGS. 10 and 11 are cross-sectional views of the HP shaft 118, taken along line 10-10 in FIG. 9. FIG. 10 shows the HP shaft 118 and the bow mitigation system 204 in a shutdown condition, and FIG. 11 shows the HP shaft 118 and the bow mitigation system 204 in an operating condition. Referring to FIGS. 9 to 11, the bow mitigation system 204 of this embodiment includes an annular housing 230 that is divided into a plurality of chambers 232. The annular housing 230 may be a balance weight assembly, and the plurality of chambers of the annular housing 230 may include a first chamber and at least one additional chamber. As with the adjustable balance weight assembly 210 discussed above, the housing 230 is attached to the HP shaft 118. The chambers 232 are arranged in the circumferential direction C of the housing 230 and the HP shaft 118, and are separated from each other by a baffle 234. The housing 230, thus, also includes a plurality of baffles 234 arranged in the circumferential direction C of the housing 230 and HP shaft 118.

Figure 12:
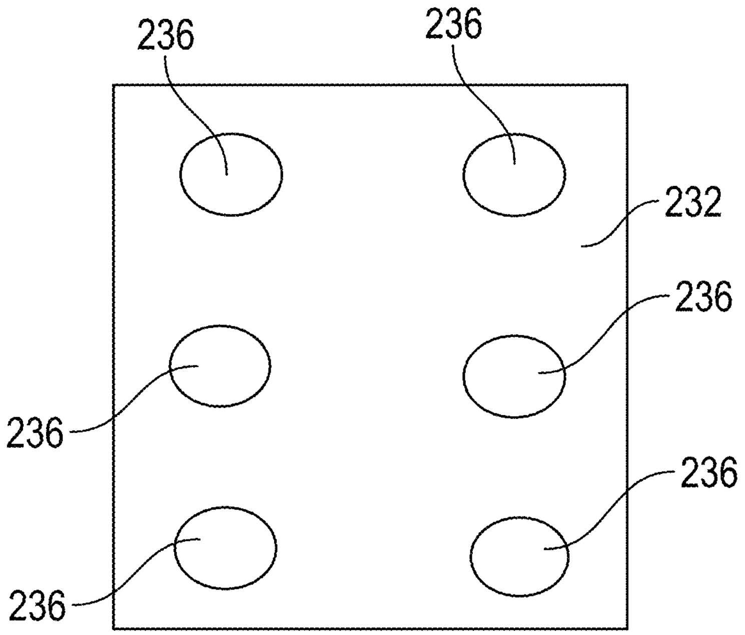
FIG. 12 shows a baffle of the bow mitigation system shown in FIGS. 9 to 11.

FIG. 12 shows the baffle 234. In this embodiment, the baffle 234 is a plate having a plurality of orifices 236 formed therein. The orifices 236 shown in FIG. 12 are ovular, but the orifices 236 may have any suitable shape. The orifices 236 are flow passages, similar to the flow passage 218 discussed above with regard to FIGS. 3 to 5 and 7, that fluidly connect adjacent chambers 232. The baffle 234 and, more specifically, the orifices 236 control the flow (rate of flow) of the movable balance weight 212 between adjacent chambers 232.

Returning to FIG. 11, in operation, the bow mitigation system 204 positions the movable balance weight 212 within the housing 230, and, more specifically, within the chambers 232 to locate the center of gravity CG on the rotational axis 118*a*. The HP shaft 118 rotates when the turbomachine 104 is operating. The housing 230 rotates with the HP shaft 118, and, as in the embodiment discussed above, inertial forces act on the movable balance weight 212 (flowable mass) causing the movable balance weight 212 to flow radially outward along an outer circumferential surface 238 of the housing 230. As shown in FIG. 11, the movable balance weight 212 may be evenly distributed along the outer circumferential surface 238 to locate the center of gravity CG on the rotational axis 118*a*.

FIG. 10 shows the bow mitigation system 204 in the shutdown condition. When the turbomachine 104 is shut down, the HP shaft 118 stops rotating, and the movable balance weight 212, which is a flowable mass in this embodiment, is driven by gravity from chambers 232 located in a top portion of the housing 230 (the top portion of the HP shaft 118) to chambers 232 that are located in a bottom portion of the housing 230 (the bottom portion of the HP shaft 118). This movement and positioning of the movable balance weight 212 produces the static imbalance, discussed above, to compensate for the bow of the HP shaft 118.

In this embodiment, the bow mitigation system 204 is passive. If desired, active controls to move the movable balance weight 212 may also be used in a manner similar to the bow mitigation system 202 of the embodiment discussed with reference to FIG. 7, with a controller, like controller 224, opening and closing the orifices 236 by suitable means, including, for example, valves, like valve 222, discussed above.

The discussion above used the HP shaft 118 as an example of a shaft in a turbomachine 104 to which the bow mitigation systems 200, 202, 204 discussed herein may be applied. These bow mitigation systems 200, 202, 204 may be applied to any other suitable shaft in the turbomachine 104 or the turbofan engine 100, more generally, including, for example, the LP shaft 138. By implementing these bow mitigation systems 200, 202, 204, the magnitude of the vibration produced by bow may be reduced and the motoring time before start-up of the turbofan engine 100 can be reduced or even eliminated. Further aspects of the present disclosure are provided by the subject matter of the following clauses.

A turbomachine comprises a turbine rotor, a compressor rotor, a shaft, and at least one balance weight assembly connected to the shaft. The turbine rotor is rotatable about a rotational axis. The compressor rotor is rotatable about the rotational axis to compress air flowing past the compressor rotor. The shaft drivingly connects the turbine rotor with the compressor rotor to rotate the compressor rotor about the rotational axis when the turbine rotor rotates about the rotational axis. The at least one balance weight assembly including a first chamber, at least one additional chamber, and a balance weight movable between the first chamber and the at least one additional chamber.

The turbomachine of the preceding clause, further comprising a plurality of compressor rotors forming a compressor section, at least one balance weight assembly connected to the shaft within the compressor section.

The turbomachine of any preceding clause, wherein the at least one balance weight assembly is connected to the compressor rotor.

The turbomachine of any preceding clause, wherein the compressor rotor includes a disk and a plurality of blades extending from the disk, the at least one balance weight assembly connected to the disk of the compressor rotor.

The turbomachine of any preceding clause, wherein the disk and the plurality of blades are formed as a single piece.

The turbomachine of any preceding clause, wherein the balance weight is a flowable mass.

The turbomachine of any preceding clause, wherein the flowable mass is at least one of (i) a powder comprising a plurality of particles, (ii) a liquid, or (iii) a semi-solid viscous mass.

The turbomachine of any preceding clause, wherein the first chamber and the at least one additional chamber are fluidly connected to each other by a flow passage, the flowable mass being movable between the first chamber and the at least one additional chamber by flowing through the flow passage.

The turbomachine of any preceding clause, wherein the first chamber is an inner chamber and the at least one additional chamber is an outer chamber.

The turbomachine of any preceding clause, wherein the inner chamber, the outer chamber, and the flow passage are arranged in an hourglass shape.

The turbomachine of any preceding clause, wherein the at least one balance weight assembly further includes a valve positioned in the flow passage and movable between a closed position and at least one open position.

The turbomachine of any preceding clause, further comprising a controller communicatively coupled to the valve of the at least one balance weight assembly to control the position of the valve.

The turbomachine of any preceding clause, wherein the controller is wirelessly communicatively coupled to the valve.

The turbomachine of any preceding clause, further comprising a plurality of the at least one balance weight assembly.

The turbomachine of any preceding clause, wherein the controller is configured to receive inputs indicating a bow of the shaft and to operate the valves to position the flowable mass within each of the balance weight assemblies.

The turbomachine of any preceding clause, wherein the controller is configured to position the flowable mass within each of the balance weight assemblies to move the center of gravity of the shaft in a direction opposite to the direction of bow.

The turbomachine of any preceding clause, wherein the plurality of the balance weight assemblies is arrayed circumferentially around the shaft.

The turbomachine of any preceding clause, wherein the first chamber of each balance weight assembly is an inner chamber and the at least one additional chamber of each balance weight assembly is an outer chamber.

The turbomachine of any preceding clause, wherein the outer chamber is positioned radially outward of the inner chamber.

The turbomachine of any preceding clause, further comprising an annular housing connected to the shaft, the annular housing being divided into a plurality of chambers in a circumferential direction of the shaft, the annular housing being the at least one balance weight assembly, and the plurality of chambers includes the first chamber and the at least one additional chamber.

The turbomachine of any preceding clause, wherein adjacent chambers of the plurality of chambers are fluidly connected to each other.

The turbomachine of any preceding clause, wherein adjacent chambers of the plurality of chambers are separated from each other by a baffle.

The turbomachine of any preceding clause, wherein the baffle is a plate having a plurality of orifices fluidly connecting adjacent chambers of the plurality of chambers.

A turbomachine comprises a turbine rotor, a compressor rotor, a shaft, and at least one movable balance weight. The turbine rotor is rotatable about a rotational axis. The compressor rotor is rotatable about the rotational axis to compress air flowing past the compressor rotor. The shaft is drivingly connecting the turbine rotor with the compressor rotor to rotate the compressor rotor about the rotational axis when the turbine rotor rotates about the rotational axis. The at least one movable balance weight is movable between a first position and a second position to change the center of gravity of the shaft.

The turbomachine of the preceding clause, further comprising a plurality of the at least one movable balance weight arrayed circumferentially around the shaft.

The turbomachine of any preceding clause, wherein the shaft includes a central axis, and wherein each movable balance weight of the plurality of the at least one movable balance weight is positioned such that the central axis does not run through the center of gravity of the shaft when a portion of the balance weights are positioned in the first position and a portion of the balance weights are positioned in the second position.

A method of balancing a bowed shaft of a turbomachine comprises determining a direction of bow of the shaft and moving at least one balance weight from a first position to a second position to move the center of gravity of the shaft in a direction opposite to the direction of bow.

The method of any preceding clause, further comprising monitoring at least one of a time after shutdown of the turbomachine or a temperature indictive of the bow of the shaft and determining a magnitude of the bow of the shaft based on the at least one of the time after shutdown or the temperature.

The method of any preceding clause, further comprising determining an amount of bow correction needed to facilitate start-up of the turbomachine based on the bow direction and the magnitude, wherein the at least one balance weight is moved based on the amount of bow correction needed.

Although the foregoing description is directed to the preferred embodiments, other variations and modifications will be apparent to those skilled in the art, and may be made without departing from the spirit or the scope of the disclosure. Moreover, features described in connection with one embodiment may be used in conjunction with other embodiments, even if not explicitly stated above.

The invention claimed is:

1. A method of balancing a shaft of a turbomachine that is bowed, the method comprising:
   determining a direction of bow of the shaft;
   monitoring at least one of a time after shutdown of the turbomachine or a temperature indictive of the bow of the shaft;
   determining a magnitude of the bow of the shaft based on the at least one of the time after shutdown or the temperature; and
   moving a balance weight connected to the shaft from a first position to a second position to move the center of gravity of the shaft in a direction opposite to the direction of bow based on the magnitude of bow of the shaft.

2. The method of claim 1, wherein the balance weight is part of a balance weight assembly including a first chamber and at least one additional chamber, and
   wherein moving the balance weight from the first position to the second position includes moving the balance weight from the first chamber to the at least one additional chamber.

3. The method of claim 1, wherein the turbomachine includes:
   a turbine rotor rotatable about a rotational axis; and
   a compressor rotor rotatable about the rotational axis to compress air flowing past the compressor rotor, the shaft drivingly connecting the turbine rotor with the compressor rotor to rotate the compressor rotor about the rotational axis when the turbine rotor rotates about the rotational axis.

4. The method of claim 1, further comprising determining an amount of bow correction needed to facilitate start-up of the turbomachine based on the direction of bow and the magnitude, wherein the balance weight is moved based on the amount of bow correction needed.

5. The method of claim 1, wherein the balance weight is a flowable mass.

6. A method of balancing a shaft of a turbomachine that is bowed, the method comprising:
   determining a direction of bow of the shaft; and
   moving a balance weight connected to the shaft from a first position to a second position to move the center of gravity of the shaft in a direction opposite to the direction of bow, the balance weight being a flowable mass,
   wherein the balance weight is part of a balance weight assembly including a first chamber and at least one additional chamber, the first chamber and the at least one additional chamber being fluidly connected to each other by a flow passage, the flowable mass being movable between the first chamber and the at least one additional chamber by flowing through the flow passage, and
   wherein moving the balance weight from the first position to the second position includes moving the balance weight from the first chamber to the at least one additional chamber.

7. The method of claim 6, wherein the flowable mass is at least one of (i) a powder comprising a plurality of particles, (ii) a liquid, or (iii) a semi-solid viscous mass.

8. The method of claim 6, wherein moving the balance weight between the first chamber and the at least one additional chamber includes operating a valve positioned in the flow passage.

9. The method of claim 6, wherein the first chamber is an inner chamber and the at least one additional chamber is an outer chamber.

10. The method of claim 9, wherein the inner chamber, the outer chamber, and the flow passage are arranged in an hourglass shape.

11. The method of claim 6, wherein the balance weight assembly is an annular housing connected to the shaft, the annular housing being divided into a plurality of chambers in a circumferential direction of the shaft, the plurality of chambers including the first chamber and the at least one additional chamber.

12. The method of claim 11, wherein adjacent chambers of the plurality of chambers are separated from each other by a baffle.

13. The method of claim 12, wherein the baffle is a plate having a plurality of orifices fluidly connecting adjacent chambers of the plurality of chambers.

14. A method of balancing a shaft of a turbomachine that is bowed, the method comprising:

determining a direction of bow of the shaft;

monitoring at least one of a time after shutdown of the turbomachine or a temperature indictive of the bow of the shaft;

determining a magnitude of the bow of the shaft based on the at least one of the time after shutdown or the temperature; and moving a plurality of balance weights connected to the shaft from a first position to a second position to move the center of gravity of the shaft in a direction opposite to the direction of bow based on the magnitude of bow of the shaft.

15. The method of claim 14, wherein the plurality of the balance weights is arrayed circumferentially around the shaft.

16. The method of claim 14, wherein each balance weight of the plurality of the balance weights is part of one balance weight assembly of a plurality of balance weight assemblies, each balance weight assembly including a first chamber and a second chamber, and wherein moving the balance weight from the first position to the second position includes moving the balance weight from the first chamber to the second chamber.

17. The method of claim 16, wherein the plurality of balance weight assemblies is arrayed circumferentially around the shaft, and wherein the first chamber of each balance weight assembly is an inner chamber and the second chamber of each balance weight assembly is an outer chamber.

18. The method of claim 17, wherein the outer chamber is positioned radially outward of the inner chamber.

19. The method of claim 16, wherein the balance weight is a flowable mass, and the first chamber and a second chamber are fluidly connected to each other by a flow passage, and wherein moving the balance weight between the first chamber and the second chamber includes operating a valve positioned in the flow passage.

20. The method of claim 2, wherein the at least one additional chamber is a second chamber, the second chamber being located radially outward of the first chamber.

* * * * *